United States Patent
Johnson

[15] 3,687,920
[45] Aug. 29, 1972

[54] POLYMERIZATION OF OLEFINS WITH SILANE MODIFIED CATALYST SYSTEM

[72] Inventor: Robert N. Johnson, Basking Ridge, N.J.

[73] Assignee: Union Carbide Corporation, New York, N.Y.

[22] Filed: Jan. 25, 1971

[21] Appl. No.: 109,168

Related U.S. Application Data

[63] Continuation-in-part of Ser. No. 22,561, March 25, 1970, abandoned.

[52] U.S. Cl. .........260/88.2 R, 252/431 R, 260/93.7, 260/94.3, 260/94.9 C, 260/94.9 D
[51] Int. Cl. ..........C08f 1/44, C08f 3/02, C08f 15/04
[58] Field of Search........260/94.9 C, 94.9 D, 88.2 R; 252/430 R

[56] References Cited

FOREIGN PATENTS OR APPLICATIONS 1,591,425  6/1970  France...................260/94.9 D
1,214,407  4/1966  Germany...............260/94.9 C Primary Examiner—Joseph L. Schofer
Assistant Examiner—A. Holler
Attorney—Paul A. Rose, Gerald R. O'Brien, Jr., Aldo John Cozzi and James J. O'Connell

[57] ABSTRACT

Silane compounds of the structure $H_3Si[SiH_2]_mH$ and $R_{4-n}SiH_n$ wherein $m$ is 0 to 3 inclusive, $n$ is 0 to 3 inclusive and R is $C_1$ to $C_{10}$ hydrocarbon are used with supported bis(cyclopentadienyl)chromium [II] catalysts for the polymerization of olefins in order to improve the productivity of the catalyst.

75 Claims, 1 Drawing Figure

PATENTED AUG 29 1972　　　　　　　　　　　　　　　3,687,920
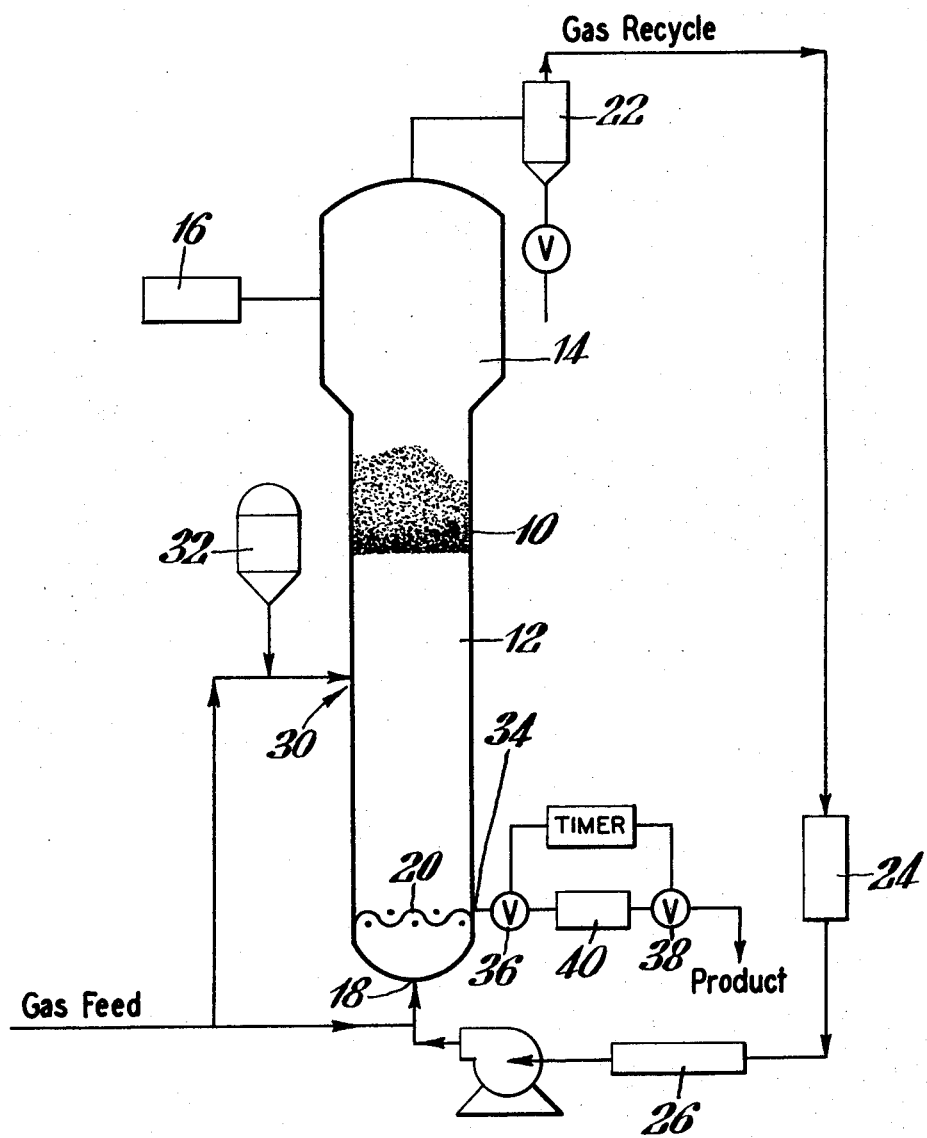
INVENTOR
ROBERT N. JOHNSON
BY James J O'Connell
ATTORNEY

POLYMERIZATION OF OLEFINS WITH SILANE MODIFIED CATALYST SYSTEM

CROSS REFERENCE TO RELATED APPLICATIONS

This patent application is a continuation-in-part of patent application Ser. No. 22,561 filed Mar. 25, 1970, now abandoned.

BACKGROUND OF THE INVENTION

1. Field of the Invention

The invention relates to the catalytic polymerization of olefin monomers.

2. Description of the Prior Art

French Pat. No. 1,591,425 discloses the use of an inorganic oxide supported bis(cyclopentadienyl)chromium [II] compound as a catalyst for the polymerization of olefin monomers such as ethylene.

Although the productivity of this catalyst is relatively high, i.e., about 300,000 parts or more of polymer may be obtained per part of supported catalyst, various attempts have been made to increase the productivity of the catalyst for obvious commercial reasons.

Such attempted procedures have included, for example, the use of scavengers for the purpose of removing catalyst poisons. These attempted procedures, however, for the most part, have either not improved the productivity of the catalyst, or they have had a deleterious effect, either on the productivity of the catalyst, or on the physical properties of the polymers made therewith.

The use of various silanes has been disclosed as an aid in activating catalyst systems which are apparently entirely inactive without the use of such silanes, as reported, for example, in U.S. Pat. No. 3,468,865 and in U.S. Pat. No. 3,476,732.

Silane compounds have also been used as reducing agents, with titanium containing olefin catalysts, as reported in U.S. Pat. No. 3,208,954 and U.S. Pat. No. 3,227,702. The reducing agent is apparently used to reduce the metal moiety to an active valence state so as to render an otherwise inactive material active.

SUMMARY OF THE INVENTION

It has now been found that the productivity of supported bis(cyclopentadienyl)chromium [II] catalysts for the polymerization of ethylene and other olefin monomers may be substantially improved without producing any adverse effects on the polymer made therewith if the catalyst is modified by the use therewith of certain silane compounds.

An object of the present invention is to provide a means for improving the olefin polymer producing productivity of supported bis(cyclopentadienyl)chromium [II] catalysts without deleteriously affecting the physical properties of the polymer made therewith.

Another object of the present invention is to provide olefin polymers having enhanced color and odor characteristics by reason of their having relatively low catalyst residue contents.

BRIEF DESCRIPTION OF THE DRAWINGS

The drawing shows a fluid bed reaction system in which the catalyst composition of the present invention may be used.

DESCRIPTION OF THE PREFERRED EMBODIMENT

It has now been found that the productivity of supported bis(cyclopentadienyl)chromium [II] catalysts in the polymerization of olefin monomers may be readily and substantially improved, without adversely affecting the properties of the polymers made therewith, if certain silane compounds are used in conjunction with the catalyst.

The silane modified catalysts of the present invention may produce about $\geq$ 800,000 parts of polymer per part of catalyst.

Silane Compounds

The silane compounds which are used with the supported bis(cyclopentadienyl)chromium [II] catalysts of the present invention have the structure $H_3Si(2)_mH$ or $R_{4-n}SiH_n$ wherein $m$ is an integer from 0 to 3 inclusive, $n$ is an integer from 0 to 3 inclusive and R is a saturated or unsaturated hydrocarbon group containing from 1 to about 10, inclusive, carbon atoms, for instance, an alkyl, alkenyl, aryl, aralkyl, cycloalkyl or alkaryl group, such as methyl, ethyl, n-propyl, iso-propyl, n-butyl, heptyl, hexyl, cycloheptyl, allyl, propenyl, phenyl, napthyl and benzyl. These compounds include silane, $SiH_4$, the unsubstituted dimer, trimer and tetramer of silane, and substituted derivatives of silane. Specific examples of these derivatives are diphenyl silane, triphenyl silane, di-1-napthyl silane, phenylsilane, ethyl silane, diethyl silane, triethyl silane, methyl diethyl silane, triisopropyl silane, tri(n-propyl) silane, diphenylmethyl silane, dibenzylsilane, triallyl silane, tri(n-hexyl) silane, tribenzyl silane, trimethyl silane and tributyl silane. Especially preferred because of their superior performance are the compounds $R_{4-n}SiH_n$ where each R is an aliphatic hydrocarbon group having one to six, inclusive, carbon atoms. The silane may contain different R groups.

Inorganic Oxide Supported Bis(cyclopentadienyl)chromium [II]

The catalysts species comprises an organometallic bis-cyclopentadienyl chromium [II] compound deposited on an inorganic oxide support.

About 0.001 to 10 percent, or more, by weight of the organometallic compound is used on the support, based on the combined weight of the organometallic compound and the inorganic oxide support. The support is loaded, as much as possible, with the organometallic compound. The amount of the organometallic compound which can be deposited on the support varies, depending on the particular support being used, and the activation temperature of such support.

The bis(cyclopentadienyl)chromium [II] compound has the structure

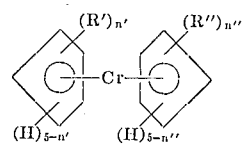

wherein R' and R'' may be the same or different $C_1$ to $C_{20}$, inclusive, hydrocarbon radicals, and n' and n'' may be the same or different integers of 0 to 5, inclusive. The R' and R'' hydrocarbon radicals may be saturated or unsaturated, they may include aliphatic, alicyclic and aromatic radicals such as methyl, ethyl, propyl, butyl, pentyl, cyclopentyl, cyclohexyl, allyl, phenyl and naphthyl radicals.

The bis(cyclopentadienyl)chromium [II] compounds which may be used as catalysts on the inorganic oxide supports in accordance with the present invention may be prepared as disclosed in U.S. Pat. Nos. 2,870,183 and 3,071,605.

The inorganic oxide materials which may be used as a support for the organometallic compounds are materials having a high surface area, that is, a surface area in the range of about 50 to about 1,000 square meters per gram. The inorganic oxides which may be used include silica, alumina, thoria, zirconia and other comparable inorganic oxides, as well as mixtures of such oxides.

Because bis(cyclopentadienyl)chromium [II] is sensitive to moisture, the catalyst support should be completely dried before it is brought into contact with the organochromium compound. This is normally done by simply heating or pre-drying the catalyst support with an inert gas prior to use. It has been found that the temperature of drying has an appreciable effect on the relative productivity of the catalyst system and on the molecular weight distribution and the melt index of the polymer produced.

Drying or activation of the support can be accomplished at nearly any temperature up to about its sintering temperature for a period of time which is at least sufficient to remove the absorbed water from the support while at the same time avoiding such heating as will remove all of the chemically bound water from the support. The passage of a stream of dry inert gas through the support during the drying aids in the displacement of the water from the support. Drying temperatures of from about 150° C. to 1,000° C. for a short period of about 6 hours or so should be sufficient if a well dried inert gas is used, and the temperature is not permitted to get so high as to completely remove the chemically bound hydroxyl groups on the surface of the support.

Any grade of support can be used but microspheroidal intermediate density (MSID) silica having a surface area of 350 square meters per gram and a pore diameter of about 200 A. (W. R. Grace's G–952 grade), and intermediate density (ID) silica having a surface area of 285 m²/gr but a pore diameter of 164 A. (W. R. Grace's G–56 grade) are preferred. Other grades such as the G–968 silica and G–966 silica-alumina, as designated by W. R. Grace and Co., having surface areas of 700 and 500 square meters per gram, respectively, and pore diameters of 50–70 A. are also quite satisfactory. Variations in melt index control and in polymer productivity can be expected between different grades of supports.

The supported catalysts can be prepared by a slurry technique where the selected and properly dried support is added under conditions which exclude the presence of air and moisture to a solution containing the bis(cyclopentadienyl)chromium [II] and solvent to form a slurry. The slurry may be stirred for a period of up to about 4 hours to obtain good absorption of the bis(cyclopentadienyl)chromium [II] on the support. The solvent is then drained from the slurry and the catalyst used as such or the retained solvent can be evaporated under conditions which exclude oxygen and moisture to yield a dry, powdery supported catalyst.

The dry supported catalyst may also be conveniently prepared in the absence of solvent by direct vapor deposition (sublimation) of the selected bis(cyclopentadienyl)chromium [II] onto a dry support. This may be simply and conveniently accomplished by blending the bis(cyclopentadienyl)chromium [II] compound and support under a dry, inert atmosphere, and then reducing the pressure to cause the bis(cyclopentadienyl)chromium [II] to sublime and absorb onto the support.

Composite Catalysts

The composite catalysts of the present invention, as noted above, are prepared from the above described silane compounds and the above described inorganic oxide supported bis(cyclopentadienyl)chromium [II] compounds.

The composite catalyst comprises about 0.0001 to 40 weight percent of the silane compound and about 60 to 99.9999 weight percent of the inorganic oxide supported bis(cyclopentadienyl)chromium [II] compound. About 0.1 to 50 mols of the silane compound are used per mole of the organochromium compound.

Depending on the type of polymerization reaction being conducted, the silane compound component of the composite catalyst may be added to the inorganic oxide supported bis(cyclopentadienyl)chromium [II] component of the catalyst system prior to the polymerization reaction, or the two components of the catalyst system may be separately added to the polymerization system. The silane may be added to the inorganic oxide support before, after, or concurrent with the addition of the organochromium compound thereto.

Where the silane compound component is added to the inorganic oxide supported bis(cyclopentadienyl)chromium [II] compound, the silane compound may be deposited from a suitable solvent.

Suitable solvents which may be used as vehicles for the deposition of the silane compound on the inorganic oxide supported bis(cyclopentadienyl)chromium [II] compound include all the organic solvents listed below which may be used in the solution polymerization reactions. The solvent, of course, must be inert to the silane compound.

Care should be taken to avoid having moisture or air contact the composite catalyst.

The mechanism by which the silane compound component increases the productivity of the inorganic oxide supported bis(cyclopentadienyl)chromium [II] catalyst is not shown. It is not known, for example, whether the silane compound chemically reacts with the inorganic oxide supported bis(cyclopentadienyl)chromium [II] component or whether some other type of mechanism is involved.

About 0.1 to 0.00001 weight percent of the composite catalyst is used per mol of monomer being polymerized. The amount of catalyst being employed may vary depending on the type of polymerization procedure being employed.

The Monomers

The monomers which are used in the monomeric charge being polymerized in accordance with the present invention may be one or more alpha-olefins containing one to about eight, inclusive, carbon atoms. The monomers may be mono-olefins or di-olefins.

The mono-olefins would include ethylene, propylene butene-1, pentene-1, 3-methylbutene-1, hexene-1, 4-methylpentene-1, 3-ethyl-butene-1, heptene-1, octene-1, decene-1, 4,4-dimethyl-pentene-1, 4,4-diethylhexene-1, 3,4-dimethylhexene-1, 4-butyl-1-octene, 5-ethyl-1-decene, 3,3-dimethyl-butene-1, and the like. Among the diolefins which may be used are butadiene, 1,5-hexadiene, dicyclopentadiene, ethylidene norbornene, and the like.

The Polymers

The solid polymers which are prepared in accordance with the teachings of the present invention include materials which have densities of about 0.950 to 0.960, inclusive, melt indexes of about 0.01 or more, and catalyst residue contents of ≤ than 1 part per million, calculated as chromium.

The preferred polymers are polymers of ethylene, homopolymers and interpolymers. The most preferred polymers are homopolymers of ethylene and copolymers containing at least 50 percent by weight of ethylene and up to 50 percent of one or more other mono-and/or diolefins which may be interpolymerized therewith.

The Polymerization Reaction

After the composite catalysts have been formed, the polymerization reaction is conducted by contacting the monomer charge, and substantially in the absence of catalyst poisons, with a catalytic amount of the catalyst at a temperature and at a pressure sufficient to initiate the polymerization reaction. If desired, an inert organic solvent may be used as a diluent and to facilitate materials handling.

The polymerization reaction is carried out at temperatures of from about 30° C. or less up to about 200° C. or more, depending to a great extent on the operating pressure, the pressure of the entire monomer charge, the particular composite catalyst being used and its concentration. Naturally, the selected operating temperature is also dependent upon the desired polymer melt index since temperature is definitely a factor in adjusting the molecular weight of the polymer. Preferably, the temperature is from about 30° C. to about 100° C. in the conventional slurry or "particle forming" technique and from 100° to 200° C. in "solution forming." The control of temperature in this process is desirable as hereinafter more fully described in providing various effects upon molecular weight of the polymers as well as in controlling the phase in which they are made. As with most catalyst systems, higher polymerization temperatures produce lower weight average molecular weight polymers, and consequently of higher melt index. In fact, by operating at the higher polymerization temperatures, polymers of a melt index of 100 to 1,000 or more are possible and can be characterized as waxes. Liquid polymers may also be prepared.

The pressure can be any pressure sufficient to initiate the polymerization of the monomer to the desired polymer and can be carried out from subatmospheric pressure, using an inert gas as a diluent, to superatmospheric pressure of up to about 1,000,000 psig (pounds per square inch gauge), or more, but the preferred pressure is from atmospheric up to about 1,000 psig. As a general rule, a pressure of 20 to 800 psig is preferred.

When an inert organic solvent medium is employed in this invention it should be one which is inert to all the other components and products of the reaction system and be stable at the reaction conditions being used. It is not necessary, however, that the inert organic solvent medium also serve as a solvent for the polymer produced. The inert organic solvents which may be used include saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like and chlorinated hydrocarbons, such as chlorobenzene, tetrachloroethylene, ortho-dichlorobenzene, and the like. Particularly preferred solvent media are cyclohexane, pentane, hexane and heptane.

When it is preferred to conduct the polymerization to a high solids level as hereinbefore set forth, it is, of course, desirable that the solvent be liquid at the reaction temperature. For example, when operating at a temperature which is lower than the solution temperature of the polymer in the solvent, the process can be essentially a slurry or suspension polymerization process in which the polymer actually precipitates out of the liquid reaction medium and in which the catalyst is suspended in a finely divided form.

This slurry system is of course dependent upon the particular solvent employed in the polymerization and its solution temperature of the polymer prepared. Consequently, in the "particle form" embodiment, it is most desirable to operate at a temperature which is lower than the normal solution temperature of the polymer in the selected solvent. For example, polyethylene prepared herein may have a solution temperature in cyclohexane of about 90° C., whereas in pentane its solution temperature may be about 110° C. It is characteristic of this "particle form" polymerization system that a high polymer solids content is possible even at low temperatures, if sufficient agitation is provided so that adequate mixing of the monomer with the polymerizing mass can be accomplished. It appears that while the polymerization rate may be slightly slower at the lower temperatures, the monomer is more soluble in the solvent medium, thus counteracting any tendency to low polymerization rates and/or low yields of polymer.

It is also characteristic of the slurry process that the monomer appears to have substantial solubility characteristics even in the solids portion of the slurry so that as long as adequate agitation is provided, and the polymerization temperature is maintained, a broad range of size of solid particles in the slurry can be provided. Experience has shown that the slurry technique can produce a system having more than a 50 percent solids content, provided sufficient fluidizing conditions and agitation are maintained. It is particularly preferable to operate the slurry process in the range of 30–40 weight percent of polymer solids.

Recovery of the polymer from the solvent medium is, in this embodiment, reduced to a simple filtration and drying operation and no efforts need be expended in polymer clean up and catalyst separation or purification. The residual concentration of catalyst in the polymer is so small, that generally no more than about 1 part of chromium per million parts of polymer can be achieved, and at such levels they are innocuous and unnoticed in the polymer. Expeditiously, they can be left in the polymer.

Operating at temperatures higher than the solution temperature of the polymer in the selected solvent medium also can produce a high polymer solids content in a solution polymerization procedure. The temperature in this type of polymerization system must be sufficiently high to enable the solvent being used to dissolve at least 25–30 percent by weight of the polymer being produced. On the other hand, the temperature must be sufficiently low to avoid thermal destruction of the formed polymer and the particular catalyst employed. In general, for the various solvents and bis(cyclopentadienyl)chromium [II] catalyst used, temperatures within the range of about 100° C. to about 200° C. and preferably about 120° C. to about 170° C. have been found to be generally optimum for the practice of such solution polymerization procedure. However, the particular polymer being produced also has a significant effect on the optimum polymerization temperature. For example, ethylene-propylene copolymers which may be produced by this process may be soluble in many of these organic solvents at low temperatures and hence the use of such temperatures is permissible in this invention even though such temperatures may not be desired for optimum production of ethylene homopolymers.

Solvents constitute one of the most significant and vexing sources of catalyst poisoning. Moreover, in most prior solution polymerization processes employing transition metal-containing catalysts, the use of large quantities of solvent, i.e., a solvent-to-polymer ratio of the order of 20:1, was believed necessary. Such large proportions of solvent, necessarily, greatly increased the catalyst poisoning problem. In the present process, however, the proportion of solvent to polymer can be as low as 0.1:1 or even less, thereby maintaining a very high catalyst productivity and efficiency of the system.

When the solvent serves as the principal reaction medium, it is of course, desirable to maintain the solvent medium substantially anhydrous and free of any possible catalyst poisons such as moisture and oxygen, by redistilling or otherwise purifying the solvent before use in this process. Treatment with an absorbent material such as high surface area silicas, aluminas, molecular sieves and like materials are beneficial in removing trace amounts of contaminants that may reduce the polymerization rate or poison the catalyst during the polymerization reaction.

However, it is also possible to operate the polymerization reaction without an added solvent reaction medium, if desired. For example, a liquid monomer itself can be the reaction medium, as in making ethylene-propylene copolymers using commercially available liquefied propylene, or by operating under sufficient pressure that a normally gaseous monomer is liquefied.

The fact that the polymerization rate remains high even at the high viscosities encountered at high solids level, is unexpected. It is particularly surprising and unexpected that the reaction rate remains high when gaseous monomers such as ethylene are employed. We found, however, that high polymerization rates are maintained even when using such gaseous monomers at pressures under 100 psig when the reaction solution is agitated by means of a high velocity, high shear stirrer, particularly one driven at speeds in excess of 2,000 rpm and designed to impart considerable shearing action on the solution.

Another particularly important advantage afforded by this aspect of the process is that the high solids content polymer solution, upon completion of the polymerization reaction, is, without any further treatment, suitable for polymer isolation, by milling techniques, such as those described in U.S. Pat. No. 2,434,707 to W. A. Marshall. The "Marshall mill" is operated most advantageously when the polymer-solvent mixture being treated is high in polymer content. The use of such an enclosed mill also permits the recycle of all or part of the separated solvent to the polymerization reactor without contact with oxygen or atmospheric water vapor which are destructive of many transition metal-containing catalysts.

Still another advantage of the present process is provided by maintaining the catalyst and the polymer, as formed, in homogeneous solution in the solvent medium. By avoiding the formation of a polymer suspension, the reaction mass behaves surprisingly as a viscous fluid which can be pumped and handled by any of the standard techniques for handling fluids.

Still another advantage of having the polymer soluble in the diluent is that high reaction temperatures can be employed. This is advantageous because the high temperatures reduce the viscosity of the solution, they also cause the polymerization to proceed faster, and allow more efficient removal of the heat of reaction because of the large temperature differential between the reactor and the cooling water, and also permit control of the polymer molecular weight since high reaction temperatures generally cause the formation of lower molecular weight polymer.

The separation of polymer from the solvent medium is not limited in this invention to the use of a high shear mill, although a Marshall mill has been found to be well suited for use herein and is preferred. However, it is also possible to employ precipitation and filtration techniques to recover to polymer, or to concentrate the polymer/solvent mass by flash evaporation or other means of solvent removal followed by high shear milling. A number of other suitable high shear mills are commercially available and, because of the low solvent content of the solution to be treated, other devices such as vented extruders, calendering roll mills, planetary rotor mills such as the one described in U.S. Pat. No. 3,075,747 to W. L. Calvert, Banbury mills, and the like, can also be successfully employed to accomplish isolation of the polymer product. By the term "high shear mill" as used hereinafter is meant a mill comprising parallel rolls having intermeshing threads, and the term "high shear conditions" and "conditions of high shear" mean those conditions achieved on a high shear mill or by adequately powered high speed mixers for viscous materials.

It should be understood that the high solids system can be employed with the composite catalyst suspended in the solvent, provided that the necessary conditions of agitation, pressure, temperature, and the like are maintained so to provide contact of the monomer with the composite catalyst, and that the pressure and temperature are such as to initiate the polymerization of that monomer to the polymer.

By conducting the polymerization reaction in the presence of hydrogen, which appears to function as a chain transfer agent, the molecular weight of the polymer may be controlled.

Experience has shown that hydrogen may be used in the polymerization reaction in amounts varying between about 0.001 to about 10 moles of hydrogen per mole of olefin monomer. For most polymerization reactions, a narrow molecular weight distribution may be obtained by using from about 0.001 to about 0.5 mole of hydrogen per mole of monomer. Stated another way, the preferred range of hydrogen is from about 0.001 to about 5 mole per cent based on the total reactor contents.

The polymerization of alpha olefins such as ethylene with the catalysts of this invention in a fluid bed reactor can be readily appreciated by reference to the following description and attached Figure which illustrates the schematic operation of a fluidized bed reactor which may be used in the practice of this invention.

Employing the catalysts of this invention there may be produced, under conditions hereinafter set forth for a fluid bed reactor, ethylene homopolymers and polymers formed by polymerizing ethylene with $\alpha$-olefins containing 3 to about 8 carbon atoms which are gaseous at the polymerization temperature and can be polymerized with ethylene at a temperature below the sintering temperature of the resultant polymer to form dry particulate resin particles essentially free of low molecular weight polymers such as waxes and greases.

Random copolymers as well as specialty polymers can also be produced in the fluid bed reactor. For instance, different monomers may be sequentially introduced to a single fluidized bed to form block copolymers. Another expedient is to transfer resin from a reactor containing one monomer through a suitable valve into a reactor containing another monomer with negligable carry over of monomer from one reactor to another. This latter expedient may also be effectively used to form mixtures of polymers. Both alternatives are particularly useful in forming block copolymers and mixtures of polymers from monomers having different reactivity properties.

The composite supported catalysts as used in the form of a concentrated slurry of particles or as powdery free flowing solid particles as hereinbefore described. The supported catalysts are preferably capable of subdivision, which is the ability of the catalyst particles to rupture in the presence of a growing polymer and thereby extend itself to form many particles having a low catalyst residue from a single catalyst particle.

The subdividable catalysts for the fluid bed reactor are preferably prepared, for instance, by depositing the silane modified bis(cyclopentadienyl)chromium [II] on a porous carrier of high surface area. When incorporated in a porous support of high surface area, the catalyst forms active sites on the surface and in the pores of the support. Although the actual mechanism of the process is not entirely understood, it is believed that the polymers begin to grow at the surface as well as in the pores of the supported catalyst. When a pore grown polymer becomes large enough, it ruptures the support thereby exposing fresh catalyst sites in the inner pores of the support. The supported catalyst may thus subdivide many times during its lifetime in the bed and thereby enhance the production of low catalyst residue polymers, thereby eliminating the need for recovering the catalyst from the polymer particles. If the support is too large, it may resist rupture thereby preventing subdivision which would result in catalyst waste. In addition, a large support may act as a heat sink and cause "hot spots" to form.

A fluidized bed reaction system which may be used in the practice of this invention is illustrated in the Figure. With reference thereto the reactor 10 consists of a reaction zone 12 and a velocity reduction zone 14.

The reaction zone 12 comprises a bed of growing polymer particles, formed polymer particles and a minor amount of catalyst fluidized by the continuous flow of polymerizable and modifying gaseous components in the form of make-up feed and recycle gas through the reaction zone. To maintain a viable fluidized bed, mass gas flow through the bed must be above the minimum flow required for fluidization, preferably from about 2 to about 6 times $G_{mf}$ and more preferably from about 3 to about 5 $G_{mf}$. $G_{mf}$ is used in the accepted form as the abbreviation for the minimum mass gas flow required to achieve fluidization, C. Y. Wen and Y. H. Yu, "Mechanics of Fluidization," Chemical Engineering Progress Symposium Series, Vol. 62, p. 100–111 (1966).

It is essential that the bed always contains particles to prevent the formation of localized "hot spots" and to entrap and distribute the powdery catalyst throughout the reaction zone. On start up, the reaction zone is usually charged with a base of particulate polymer particles before gas flow is initiated. Such particles may be identical in nature to the polymer to be formed or different therefrom. When different, they are withdrawn when the desired formed polymer particles as the first product. Eventually, a fluidized bed of the desired particles supplants the start-up bed.

The catalyst concentration in the fluidized bed is substantially equal to the catalyst concentration in the product, namely in the order of about 0.005 to about 0.50 percent of bed volume.

The catalyst used in the fluidized bed is preferably stored for service in a reservoir 32 under a nitrogen blanket.

Fluidization is achieved by a high rate of gas recycle to and through the bed, typically in the order of about 50 times the rate of feed of make-up gas. The fluidized bed has the general appearance of a dense mass of viable particles in possibly free-vortex flow as created by the percolation of gas through the bed. The free flow of particles, and therefore fluidization, is substantiated by the fact that axial pressure drop through the bed is typically in the order of only about 1 psig.

Make-up gas is fed to the bed at a rate equal to the rate at which particulate polymer product is withdrawn. The composition of the make-up gas is determined by a gas analyzer 16 positioned above the bed. The gas analyzer determines component deficiency in the gas being recycled and the composition of the make-up gas is adjusted accordingly to maintaining an essentially steady state gaseous composition within the reaction zone.

To insure complete fluidization, the recycle gas and, where desired, part of the make-up gas are returned to the reactor at point 18 below the bed. There exists a gas distribution plate 20 above the point of return to aid fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or enterior thereto. Where desired, the recycle gas may then be passed through a filter 24 designed to remove small particles at high gas flow rates to prevent dust from contacting heat transfer surface and compressor blades.

The recycle gas is then passed through a heat exchanger 26 wherein it is stripped of heat of reaction before it is returned to the bed. By constantly removing heat of reaction, no noticeable temperature gradient appears to exist within the bed. In particular, it has been observed that the bed acts to almost immediately adjust the temperature of the recycle gas to make it conform to the temperature of the bed thereby maintaining itself at an essentially constant temperature under steady state conditions. The recycle is then compressed in a compressor 28 and returned to the reactor at its base 18 and to the fluidized bed through distribution plate 20.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. Whatever its design, it must diffuse the recycle gas through the particles at the base of the bed to keep them viable, and also serve to support a quiescent bed of resin particles when the reactor is not in operation.

Hydrogen as a component of the gas stream is of equally significant utility in the vapor phase polymerization in the fluidized bed reactor as in more conventional systems. In vapor phase polymerization the melt index of the product is relatively insensitive to temperature in that a moderate change in operating temperature will not result in any significant change in melt index. Therefore, an alternate means to modify, where desired, melt index must be resorted to. It has been found that hydrogen influences the melt index of the polymer product. As set forth above, the melt index of the product increases as the hydrogen concentration in the gas stream is increased.

Hydrogen may be used in the polymerization reaction in amounts varying between about 0.001 to about 10 moles of hydrogen per mole of monomer. For most polymerization reactions, a narrow molecular weight distribution may be obtained by using from about 0.01 to about 0.5 mole of hydrogen per mole of monomer.

Also, if desired for temperature control of the system, any gas inert to the catalyst and reactants can be present.

It is essential to operate the fluid bed reactor at a temperature below the sintering temperature of the polymer particles. To insure that sintering will not occur, operating temperatures considerably below the sintering temperature are desired. For the production of ethylene homopolymers an operating temperature of from about 70° to about 110° C. is preferred, whereas an operating temperature of about 90° C. or lower is preferred for ethylene copolymers.

The fluid bed reactor is preferably operated at a pressure of from about 40 to 300 psi or more, with operation at the intermediate and elevated pressures favoring heat transfer since an increase in pressure increases the unit volume heat capacity of the gas.

The catalyst is injected into the bed at rate equal to its consumption at a point 30 which is above the distribution plate 20. Preferably, the catalyst is injected at a point located about one-fourth to three-fourths up the side of the bed. Injecting the catalyst at a point above the distribution plate is an important feature of this invention. Since the catalysts used in the practice of the invention are highly active, injection into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots."

All or part of the make-up feed stream is used to carry the catalyst into the bed. It is preferred to use only part of the make-up feed stream as the carrier for the catalyst since at high productivities, the injection of a large amount of gas into the side of the bed may disrupt the characteristics of the bed and cause channeling or the like. As an alternative procedure, part of the recycle gas stream can be diverted for the purpose of carrying catalyst into the bed.

The productivity of the bed is solely determined by the rate of catalyst injection. The productivity of the bed may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in rate of heat generation. This insures the maintenance of an essentially constant temperature in the bed. Complete instrumentation of both the fluidized bed and the recycle gas cooling system, is, of course, necessary to detect any temperature change in the bed so as to enable the operator to make a suitable adjustment in the temperature of the recycle gas.

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a thermal analysis of the gas leaving the reactor is determinative of the rate of particulate polymer formation.

The particulate polymer product is preferably continuously withdrawn at a point 34 at or close to the dispersion plate 20 and in suspension with a portion of the gas stream which is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone. Valve 38 is then closed to wait the next product recovery operation.

Finally, the fluidized bed reactor is equipped with an adequate venting system to allow venting the bed during start up and shut down.

The supported catalyst system of this invention appears to yield a fluid bed product having an average particle size between about 40 and 100 mesh wherein catalyst and carrier residue is unusually low.

In operating the fluidized bed reactor several advantages have been observed when compared to current slurry and solution processes.

A major advantage is that there appears to be no tendency for the polymer to coat the walls of the fluid bed reactor. The formation of a coating of polymer on the walls of slurry and solution reactors is a relatively uncontrollable and unpredictable phenomenon which hinders heat transfer and may cause clumps of polymer to "break-off" into the system.

On a productivity basis the fluidized bed reactor appears to offer reduced installation and operating costs.

It is also more stable in that it tends to naturally dampen any sudden change in operating conditions. There appears, therefore, to be more leeway in operating the fluidized bed reactor.

Finally, a most significant advantage is an improved ability to control gas composition. Gas composition in the slurry and solution reactors is limited by monomer solubility and diffusivity. Since there are no liquids in the fluidized bed reactor, the gas composition is essentially infinitely variable, and useful gas compositions are governed only by the relative reactivities of the monomers present.

The following Examples are designed to illustrate the present invention and are not intended as a limitation upon the scope thereof.

The properties of the polymers produced in the Examples were determined by the following test methods:

| | | |
|---|---|---|
| Density | ASTM D-1505 | Plaque is conditioned for one hour at 120° C. to approach equilibrium crystallinity. |
| Melt Index (MI) | ASTM D-1238 | Measured at 190° C. reported as grams per 10 minutes. |
| Flow Rate (HLMI) | ASTM D-1238 | Measured at 10 times the weight used in the melt index test above. |
| Flow Ratio (FRR) = Flow Rate/Melt Index | | |
| Intrinsic viscosity (I.V.) | | Measurement made on a solution of 0.15 grams of polymer in 100 cc. of decalin at 130° C. |

EXAMPLES 1-40

Various composite catalyst systems were prepared and evaluated in Examples 1 to 40 under slurry polymerization conditions as disclosed below. Various supports and silanes were used in such composite catalysts. The organo chromium compound used in such examples was bis(cyclopentadienyl)chromium [II], i.e., the compound in which $n$ and $n'$, as defined above, are each 0.

Unless otherwise indicated, each of the composite catalysts were prepared as follows: about 0.4 grams of the inorganic oxide support were activated by first heating the support in dry argon for 4 hours at 150° C. followed by an additional or second, heat treatment at the same or a higher temperature, as noted above, for at least 15–24 more hours. The thus activated supported was then suspended in 100 ml of dry hexane under argon and to the resulting suspension there was then added a solution of the organochromium compound in heptane or toluene. When a silane was used a solution of the silane compound in the same solvent was also added to the suspended support, either before or after the addition of the organochromium compound, and the resulting admixture was then added to a one liter autoclave reactor equipped with a stirrer. The reactor also contained 500 ml of dry solvent. The resulting mixture was then stirred for about 10 minutes at 55° to 70° C.

The polymerization reaction was then conducted by admitting, under pressure, ethylene monomer, continuously at 200 psig., and hydrogen, batchwise, into the reactor at polymerization temperatures. After the desired polymerization time the ethylene feed was shut off and the reactor was cooled. The resulting polymer was then recovered by filtration followed by evaporation of solvent residue. Various physical tests were run on the polymer produced.

Tables I to VI presented below disclose data relating to the evaluation of various silane compounds in Examples 1 to 37f in accordance with the present invention. The data relates to variations in the compositions of the various composite catalysts that were evaluated, the reaction conditions employed, and the yields and properties of the polymers that were obtained, in the different experiments. Thus the tables may disclose the amounts of each of the organochromium (BCPC) compound and silane compounds (in millimoles); the type and/or activation temperature of the inorganic oxide support; the feed of hydrogen and/or ethylene (in pounds per square inch gauge psig.); the polymerization temperature (in °C) and/or time (in minutes) that was employed in each Example; as well as the yield (in grams); melt index (MI); flow rate (HLMI); flow ratio (FRR); density (Den); and/or intrinsic viscosity (I.V.) of each of the polymers produced in such Examples.

In Examples 1-11d the use of diethyl silane was evaluated under varying conditions. Table I below lists the variations that were employed in Examples 1 to 11d in evaluating this silane compound in accordance with the teachings of the present invention. In Examples 1-11 the inorganic oxide support used was an intermediate density silica having a surface area of about 285 m²/gr and a pore diameter of about 164 A., and the support used in Examples 11a–11d was an intermediate density silica having a surface area of about 350 m²/gr and a pore diameter of about 200 A. The supports used in each of the Examples were activated at different temperatures and the temperature at which the support was heated during the second heat treatment step in the activation procedure is noted in Table I.

In Examples 12 to 26 the use of triethyl silane was evaluated under varying conditions. Table II below lists the variations that were employed in Examples 12 to 26 in evaluating this silane compound in accordance with the teachings of the present invention. In Examples 12 to 24 the inorganic oxide support used was an intermediate density silica having a surface area of about 285 m²/gr and a pore diameter of about 164 A., and in Examples 25–26 the inorganic oxide support used was an intermediate density silica having a surface area of about 350 m²/gr and a pore diameter of about 200 A. The supports used in each of the Examples were activated at different temperatures and the temperature at which the support was heated during the second heat treatment step in the activation procedure is noted in Table II. All the reactions were run for 30 minutes.

In Examples 27 to 30d the use of methyl diethyl silane was evaluated under varying conditions. Table III below lists the variations that were employed in Examples 27 to 30d evaluating this silane compound in accordance with the teachings of the present invention. In Examples 27 to 30d two different inorganic oxide supports were used. The support used in Examples 27, 28,

TABLE I

Examples 1 to 11d—Use of Diethyl Silane

| Example | BCPC, mmoles | Silane, mmoles | Support act. T., °C | H², p.s.i.g. | Polymerization Temp., °C | Polymerization Time, min. | Yield, gr. | MI | HLMI | FRR | Den. | I.V. |
|---|---|---|---|---|---|---|---|---|---|---|---|---|
| 1 | 0.0275 | 0.026 | 625 | 0 | 90 | 30 | 120 | NF | 0.2 | | | |
| 2 | 0.112 | 0 | 650 | 0 | 95 | 34 | 160 | NF | NF | | | |
| 3 | 0.0385 | 0.0385 | 625 | 12 | 89 | 30 | 133 | 2.1 | 64 | 30 | | |
| 4 | 0.0385 | 0 | 625 | 12 | 89 | 30 | 67 | 0.14 | 5.9 | 42 | | |
| 5 | 0.0275 | 0.055 | 625 | 12 | 91 | 20 | 113 | 4 | 169 | 42 | | 1.56 |
| 6 | 0.0165 | 0.0192 | 625 | 12 | 90 | 30 | 98 | 2.0 | 58 | 29 | | 2.03 |
| 7 | 0.0165 | 0 | 625 | 12 | 89 | 48 | 41 | 0.26 | 11.2 | 43 | | |
| 8 | 0.0275 | 0.055 | 820 | 12 | 95 | 25 | 117 | 2.1 | 95 | 45 | | 1.74 |
| 9 | 0.0275 | 0 | 820 | 17 | 85 | 50 | 63 | 1.2 | 55 | 46 | | 1.84 |
| 10 | 0.0110 | 0.0128 | 625 | 17 | 89 | 100 | 98 | 1.5 | 35 | 24 | 0.958 | 1.9 |
| 11 | 0.0110 | 0 | 625 | 12 | 90 | 30 | Tr. | | | | | |
| 11a | 0.0385 | 0.0775 | 900 | 20 | 85 | 30 | 92 | 9.4 | 404 | 43 | | 1.20 |
| 11b | 0.0385 | 0 | 900 | 20 | 85 | 45 | 72 | 3.4 | 144 | 43 | | 1.47 |
| 11c | 0.084 | 0.94 | 150 | 50 | 85 | 80 | 80 | 1.96 | 124 | 64 | | |
| 11d | 0.168 | 0 | 150 | 50 | 85 | 30 | Tr. | | | | | |

Note.—NF=No flow; TR=trace.

TABLE II

Examples 12 to 26—Use of Triethyl Silane

| Example | BCPC, mmoles | Silane, mmoles | Support act T., °C | H², p.s.i.g. | Temp., °C | Yield, gr. | MI | HLMI | FRR | Den. | I.V. |
|---|---|---|---|---|---|---|---|---|---|---|---|
| 12 | 0.055 | 0.055 | 355 | 13 | 89 | 43 | 0.45 | 24 | 54 | | |
| 13 | 0.055 | 0.107 | 355 | 13 | 89 | 50 | 0.37 | 20 | 56 | | |
| 14 | 0.066 | 0 | 300 | 30 | 80 | 8 | 0.10 | 6.4 | | | |
| 15 | 0.0385 | 0.027 | 625 | 10 | 80 | 103 | 0.30 | 12 | 40 | 0.955 | 2.59 |
| 16 | 0.0385 | 0.0385 | 625 | 12 | 80 | 110 | 0.65 | 31 | 48 | | |
| 17 | 0.0385 | 0.074 | 625 | 15 | 80 | 117 | 2.0 | 79 | 39 | 0.959 | 1.77 |
| 18 | 0.0385 | 0.147 | 625 | 15 | 90 | 103 | 1.2 | 52 | 43 | 0.954 | 1.84 |
| 19 | 0.0385 | 0.295 | 625 | 12 | 90 | 103 | 0.60 | 24 | 41 | | |
| 20 | 0.0385 | 0.78 | 580 | 20 | 86 | 96 | 3.2 | 138 | 43 | | 1.47 |
| 20a | 0.0385 | 1.55 | 580 | 20 | 85 | 108 | 7.6 | 265 | 34 | | 1.25 |
| 21 | 0.0385 | 0 | 580 | 12 | 90 | 67 | 0.14 | 6 | 49 | | |
| 22 | 0.055 | 0.027 | 580 | 13 | 89 | 116 | 0.60 | 20 | 34 | | |
| 23 | 0.055 | 0.055 | 580 | 10 | 92 | 139 | 0.44 | 18 | 42 | 0.954 | |
| 24 | 0.055 | 0 | 580 | 13 | 90 | 100 | 0.46 | 22 | 48 | 0.954 | 2.39 |
| 25 | 0.055 | 0.0775 | 900 | 20 | 85 | 93 | 2.5 | 110 | 44 | | 1.55 |
| 26 | 0.055 | 0 | 900 | 20 | 86 | 72 | 3.4 | 144 | 43 | | 1.47 |

TABLE III

Examples 27 to 30d—Use of Methyl Diethyl Silane

| Example | BCPC, mmoles | Silane, mmoles | Support act. T., °C | H², p.s.i.g. | Polymerization Temp., °C | Polymerization Time, min. | Yield, gr. | MI | HLMI | FRR |
|---|---|---|---|---|---|---|---|---|---|---|
| 27 | 0.0275 | 0.055 | 600 | 17 | 87 | 30 | 95 | 2.4 | 103 | 43 |
| 28 | 0.0375 | 0 | 600 | 30 | 85 | 35 | 62 | 6.0 | 284 | 47 |
| 29 | 0.0275 | 0.055 | 820 | 17 | 87 | 30 | 118 | 1.7 | 74 | 43 |
| 30 | 0.0275 | 0 | 820 | 17 | 85 | 30 | 63 | 1.2 | 55 | 46 |
| 30a | 0.055 | 0.110 | 315 | 20 | 85 | 45 | 69 | 3.7 | 142 | 38 |
| 30b | 0.066 | 0 | 300 | 30 | 80 | 30 | 8 | 0.1 | 6.4 | |
| 30c | 0.0385 | 0.0775 | 900 | 20 | 86 | 30 | 103 | 3.8 | 150 | 40 |
| 30d | 0.055 | 0 | 900 | 20 | 86 | 30 | 72 | 3.4 | 144 | 43 |

30a and 30b was that used in Examples 1 to 11 and the support used in Examples 29, 30, 30c and 30d was a microspheroidal intermediate density silica having a surface area of about 350 m²/gr and a pore diameter of about 200 A. The supports used in each of the Examples were activated at different temperatures and the temperature at which the support was heated during the second heat treatment step in the activation procedure is noted in Table III.

In Examples 31–33 the use of tetraethyl silane was evaluated under varying conditions. Table IV below lists the variations that were employed in Examples 31 to 33 in evaluating this silane compound in accordance with the teachings of the present invention. In Examples 31 to 33 the inorganic oxide support used was an intermediate density silica having a surface area of about 285 m²/gr and a pore diameter of about 164 A. The supports used in each of the Examples were activated at 625 C. Each of the reactions were run for 30 minutes under a hydrogen pressure of 12 psig.

TABLE IV

Examples 31 to 33—Use of Tetraethyl Silane

| Example | BCPC, mmoles | Silane, mmoles | Temp., °C. | Yield, gr. | MI | HLMI |
|---|---|---|---|---|---|---|
| 31 | 0.0275 | 0 | 89 | 84 | 0.24 | 11 |
| 32 | 0.0275 | 0.0275 | 90 | 96 | 0.40 | 18.6 |
| 33 | 0.0275 | 0.55 | 89 | 124 | 0.14 | 6.0 |

EXAMPLES 34–35

In Examples 34 to 35 the use of trihexyl silane was evaluated. Table V below lists the conditions that were employed in evaluating this silane compound in accordance with the teachings of the present invention. In Examples 34 to 35 the support used was that of Examples 1 to 11 which had been activated at 600° C. The reactions of Examples 34 to 35 were each run for 35 minutes at 85° C. under a hydrogen pressure of 30 psig.

TABLE V

Examples 34 to 35—Use of Trihexyl Silane

| Example | BCPC, mmoles | Silane, mmoles | Yield, gr. | MI | HLMI | FRR |
|---|---|---|---|---|---|---|
| 34 | 0.0375 | 0 | 62 | 6.0 | 284 | 47 |
| 35 | 0.0275 | 0.055 | 87 | 9 | 385 | |

EXAMPLES 36 to 37f

In Examples 36 to 37f the use of monobutyl silane was evaluated. Table VI below lists the conditions that were employed in evaluating this silane compound in accordance with the teachings of the present invention. In Examples 36 to 37b the support used was that of Examples 1 to 11, and the support used in Examples 37c to 37f was that used in Examples 11a–11d.

The data shown in Tables I to VI indicates that the use of the silane additives of the present invention greatly increases the yield of polymer produced without deleteriously affecting the properties of such polymers. The use of organo-chromium compound to silane compound mol ratios of about 1:1 to 1:10 and/or the use of supports which have been heated at the lower heat activation temperatures i.e., ⩾ 650) tends to produce optimum results in terms of increased yields. The use of higher mol ratios of the silane compounds, and/or supports which have been activated at the higher activation temperatures also tends to result in improved yields, although such improvements are not as substantial as the improvements which are obtained with lower silane mol ratios and/or supports which have been activated at lower temperatures.

The polymers produced in Examples 1 to 37f, when made with the aid of the silane compounds of the present invention, had relatively low catalyst residue contents, as a result of the high productivity of the catalysts, and had good color and odor properties as well.

EXAMPLES 38–40

In Examples 38 to 40 various silanes were evaluated which are outside the scope of the present invention. The silanes used were, dichlorodimethyl silane in Example 38, dichloromonomethyl silane in Example 39 and trimethoxy silane in Example 40. The support used was that of Examples 1 to 11. Table VII below lists the other conditions that were employed, and the yields obtained, in evaluating these silanes. The yields obtained with the silanes of Examples 38 to 40 demonstrate that not all silane compounds can be used to improve the yields of inorganic oxide supported bis(cyclopentadienyl)chromium [II] catalysts, even when the silanes are used at the optimum mol ratios, and the are activated at the optimum activation temperatures, as are used in the present invention.

TABLE VII

Examples 38 to 40—Use of Various Silanes

| Example | Silane compound | Mmole silane | Mmoles BCPC | Support act. T., °C. | H², p.s.i.g. | Polymerization Temp., °C. | Polymerization Time, min. | Yield, gr. |
|---|---|---|---|---|---|---|---|---|
| 38 | Me₂SiCl₂ | 0.057 | 0.056 | 625 | 13 | 90 | 30 | 5 |
| 39 | MeSiCl₂H | 0.056 | 0.056 | 600 | 17 | 85 | 33 | 0 |
| 40 | (CH₃O)₃SiH | 0.056 | 0.056 | 600 | 17 | 85 | 30 | 0 |

EXAMPLES 41 TO 42

Various composite catalyst systems were prepared and evaluated in Examples 41 to 42 under fluid bed reaction conditions. The reactor used was one having the general configuration of the reactor shown in the

TABLE VI

Examples 36 to 37f—Use of Monobutyl Silane

| Example | BCPC, mmoles | Silane, mmoles | Support act. T., °C. | Time, min. | Temp., °C. | H², p.s.i.g. | Yield, gr. | MI | HLMI | FRR |
|---|---|---|---|---|---|---|---|---|---|---|
| 36 | 0.0385 | 0 | 600 | 40 | 84 | 17 | 65 | 0.23 | 12.2 | 53 |
| 37 | 0.0385 | 0.077 | 600 | 30 | 86 | 17 | 129 | 4.1 | 160 | 39 |
| 37a | 0.066 | 0 | 300 | 30 | 80 | 20 | 8 | 0.1 | 6.4 | |
| 37b | 0.055 | 0.109 | 315 | 30 | 83 | 15 | 76 | 0.24 | 13.5 | 56 |
| 37c | 0.055 | 0 | 900 | 30 | 86 | 20 | 72 | 3.4 | 144 | 43 |
| 37d | 0.0385 | 0.0775 | 900 | 45 | 86 | 20 | 97 | 7.2 | 252 | 35 |
| 37e | 0.168 | 0 | 150 | 30 | 86 | 50 | Tr. | | | |
| 37f | 0.056 | 0.62 | 150 | 100 | 85 | 50 | 131 | 0.70 | 43 | 61 |

NOTE.—Tr=Trace.

drawings. The reactor had a 14 inch diameter. The silane compound used in Examples 41 to 42 was triethyl silane; the organochromium compound used was that of Examples 1 to 40 and the support used was that of Examples 1 to 11.

Unless otherwise indicated the composite catalyst was prepared as follows: about 400 grams of the support were activated under nitrogen by being heated at 200° C. for 4 hours followed by an additional heating for 12 hours at 600°. The thus activated support was then added to about 2,000 cc of dry isopentane in, under nitrogen, a flask and the system was stirred for about 15 minutes. When the silane compound was used it was then added to the suspended support and the system was stirred for about 15 to 30 minutes. The amount of silane used was either 1 (Example 41) or 2 (Example 42) mols of silane per mol of organo chromium compound which was to be added. The organo chromium compound was then added as a solution in about 480 cc of dry isopentane, and the resulting system was then stirred for about 2 hours at 25°–30° C. The amount of organo chromium compound used was 4 (Example 41) or 2 (Example 42) weight percent, based on the total weight of the composite catalyst. The temperature of the system was then raised to 40° to 45° C. to boil off the solvent. When the solvent was removed, there remained a grayish colored, dry, free-flowing powder.

The polymerization reactions for examples 41 to 42 were conducted at a temperature of 100° C. and under a total pressure of 300 psig for various periods of time. The pressure was supplied by ≥ 90 mol percent of ethylene, 1 to 10 mol percent of hydrogen and small amounts of nitrogen which was used to carry the catalyst into the reactor.

Table VIII below discloses additional data relating to the evaluation of the triethyl silane additive in Examples 41 to 42 in accordance with the present invention. The data relates to variations in the composition of the various composite catalysts that were evaluated, the reaction conditions employed, and the yields (productivities) of polymer that were produced in the different experiments. Thus Table VIII discloses the weight percent of the organo chromium compound (BCPC) and the mole ratio of silane (TES) compound to organo chromium compound that were employed.

The productivity values are based on ashed samples of the polymers. The polymers were ashed to determine their elemental chromium content, as well as their catalyst content, i.e., silica plus chromium plus silane.

The reaction conditions listed in Table VIII show variations in the $H_2/C_2H_4$ mol ratios, the space-time yields and catalyst residence times that were employed.

TABLE VIII

Examples 41 to 42

Use of Triethyl Silane in Fluid Bed Reactor

| Example | 41 | 42 |
|---|---|---|
| Catalyst Composition | | |
| BCPC—wt % | 4 | 2 |
| Support Act. | | |
| Temp. – °C. | 600 | 600 |
| Mol ratio of | | |
| TES/BCPC | 1:1 | 2:1 |
| Productivity | | |
| lb polymer/lb catalyst | 9100 | 4550 |
| lb polymer/lb chromium | 800,000 | 766,000 |
| Residue, as Cr, ppm | 1.3 | 1.3 |
| Reaction Conditions | | |
| Mol ratio — $H_2/C_2H_4$ | 0.0277 | 0.0696 |
| Space-Time yield | | |
| lb/hr/cu ft | 6.2 | 6.1 |
| Residence Time, hrs. | 3.1 | 3.2 |
| of catalyst in the reactor | | |

The productivity values shown in Table VIII for Examples 41 to 42 represent increases in productivity of the order of about 100% over the productivity values that are obtained, under the same operating conditions, and with the same catalyst, except for the use of the silane additive.

The polymers produced in Examples 41 to 42 had enhanced color and odor properties because of their relatively low chromium residue contents and they had good physical properties.

The enhanced odor properties are a function of catalyst residue content because the resins are usually employed with stabilizers which are prone to react with the organo chromium compounds in the catalyst residue and these reaction products are usually malodorous. The lower is the catalyst residue content, the better are the odor properties of the stabilized resins.

EXAMPLES 43–61

Various additional composite catalyst systems were prepared and evaluated in accordance with the present invention, in Examples 43–50 and 53–61 under slurry polymerization conditions, and in Examples 51–52 under solution polymerization conditions. Various supports and silanes were used in such composite catalysts. The organochromium compound used was bis(cyclopentadienyl)-chromium [II], as in Examples 1–40. The catalysts were prepared and the reactions were conducted as in Examples 1–40. About 0.4 of support was used in preparing each of the catalysts that were evaluated. The reactions were run for 30–60 minutes.

Tables IX to XIII presented below disclose data relating to the evaluation of the various silane compounds used in Examples 43–61. The data is of the same type as that reported in Tables I to VI as noted above.

In Examples 43–44 the use of silane, $SiH_4$, was evaluated in the homopolymerization of ethylene. The inorganic oxide support used in Examples 43–44 was a microspheroidal intermediate density silica having a surface area of 350 $m^2$/gram and a pore diameter of about 200 A. which had been activated at 250° C. The reactions of Examples 43–44 were conducted at 87° C. with 30 psig of $H_2$ and a total pressure of 200 psig. When the silane was used in Example 43 it was admitted to the reactor as a gas at 50° C. after the admission of the organochromium compound on the support. The reactor was then heated to 75° C. at which time the $H_2$ and ethylene were admitted to the reactor. Table IX below lists other data relating to Examples 43–44 and the polymer produced therein.

TABLE IX

Examples 43–44 — Use of Silane

| Example | BCPC mmoles | Silane mmoles | Yield gr/hour | MI | HLMI | FRR |
|---|---|---|---|---|---|---|
| 43 | 0.084 | 0.3 | 250 | 14.6 | 544 | 37 |
| 44 | 0.084 | 0 | trace | — | — | — |

In Examples 45–50 the use of phenyl silane was evaluated in the homopolymerization of ethylene. The inorganic oxide support used in Examples 45–46 was an intermediate density silica having a surface area of 285 $m^2$/gram and a pore diameter of about 164 A. and the support used in Examples 47–50 was that of Examples 41–42. The reactions of Examples 45–50 were conducted at 85°–86° C. with 20 or 50 psig of $H_2$ and a total pressure of 200 psig. The phenyl silane was added to the support before the organochromium compound was added to the support. Table X below lists other data relating to Examples 45–50 and the polymer products made therein.

TABLE X

Examples 45–50 — Use of Phenyl Silane

| ex. | BCPC mmoles | silane mmoles | Support Act. temp. °C. | $H_2$ psig | yield gr/hour | MI | HLMI | FRR | IV |
|---|---|---|---|---|---|---|---|---|---|
| 45 | 0.0385 | 0.0775 | 580 | 20 | 242 | 9.6 | 367 | 38 | — |
| 46 | 0.0385 | 0 | 580 | 20 | 176 | 1.2 | 53 | 44 | — |
| 47 | 0.0385 | 0.0764 | 900 | 20 | 132 | 3.5 | 132 | 38 | 1.42 |
| 48 | 0.0385 | 0 | 900 | 20 | 963.4 | t144 | | 43 | 1.47 |
| 49 | 0.084 | 0.93 | 150 | 50 | 104 | 3.3 | 154 | 47 | — |
| 50 | 0.168 | 0 | 150 | 50 | trace | — | — | — | — |

In Examples 51–52 the use of methyl diethyl silane was evaluated under solution polymerization conditions in the homopolymerization of ethylene. The inorganic oxide support used in Examples 51 was that of Examples 45–46 and the support used in Example 52 was that of Examples 47–50. No hydrogen was used and the ethylene was supplied at 200 psig. Table XI below lists other data relating to Examples 51–52 and the polymer products made therein.

TABLE XI

Examples 51–52 — Use of Methyl diethyl silane Under Solution Polymerization Conditions

| ex. | BCPC mmoles | Silane mmoles | Support Act. temp. °C. | poly. temp. °C. | Yield gr/hour | M.I. | % unsaturation |
|---|---|---|---|---|---|---|---|
| 51 | 0.055 | 0.110 | 600 | 112 | 70 | 89 | 0.80 |
| 52 | 0.055 | 0 | 750 | 115 | 35 | — | 0.73 |

% unsaturation = % trans + % vinyl
% trans = $(R_t)(11.1)/T$
where $R_t$ = infra red absorbance at 10.4 $\mu$ divided by base line absorbance at 10.4 $\mu$
T = film thickness in mils
% vinyl = $(R_c)(7.80)/T$
$R_c$ = infra red absorbance at 11.0$\mu$ divided by base line absorbance at 11.0$\mu$ In Examples 53–58 the use of butyl silane and methyl diethyl silane (MDES) was evaluated in the copolymerization of ethylene with propylene or butene-1. The inorganic oxide support used in Examples 53–56 was that of Examples 43–44 which had been activated at 205° C., and the support used in Examples 57–58 was that of Examples 45–46 which had been activated at 790° C. The reactions were conducted at 85° C. with 20 psig of $H_2$ and a total pressure of 200 psig. When propylene was used it was added to the reactor, at ambient pressure, prior to the addition of the ethylene. When butene-1 was used, the hydrogen and ethylene were first introduced into the reactor with the catalyst and the reaction was allowed to proceed for about 5 minutes. Then the reaction system was cooled to about 50° C. and then the ethylene pressure was vented. Then the butene-1 was added to the reactor, and hydrogen (at 20 psig) and ethylene was again charged into the reactor to again provide a total pressure of 200 psig. Table XII below lists other data relating to Examples 53–58 and the polymer products made therein.

TABLE XII

Examples 53–58 — Use of Silanes in Preparation of Copolymers

| ex. | BCPC mmoles | silane | silane mmoles | comonomer (grams) | yield gr/hour | MI | % methyl |
|---|---|---|---|---|---|---|---|
| 53 | 0.055 (10) | Butyl | 0.310 | butene | 163 | 0.93 | 0.26 |
| 54 | 0.055 (10) | none | 0 | butene | trace | — | — |
| 55 | 0.055 (5) | Butyl | 0.217 | propylene | 208 | 0.74 | 0.13 |
| 56 | 0.055 (5) | none | 0 | propylene | trace | — | — |
| 57 | 0.0385 (5) | MDES | 0.0774 | propylene | 226 | 18.2 | 0.48 |
| 58 | 0.0385 (6) | none | 0 | propylene | 172 | 4.8 | 0.50 |

% methyl = $(R_m)(33.8)/T$
where $R_m$ = infrared absorbance at 7.25$\mu$ divided by base line absorbance at 7.25$\mu$.
T = film thickness in mils In Examples 59–61 the use of Triethyl silane (TES) and methyl diethyl silane (MDES) was evaluated in the homopolymerization of ethylene. The inorganic oxide support used was a silica-alumina material having a surface area of about 500 m²/gram and a pore diameter of 50–70 A. The support activated at 590° C. The reactions were conducted at 84°–86° C. with 20 psig of $H_2$ and a total pressure of 200 psig. Table XIII below lists other data relating to Examples 59–61 and to the polymer products made therein.

TABLE XIII

Examples 59–61 — Use of Triethyl silane and methyl diethyl silane

| ex. | BCPC mmoles | Silane | Silane mmoles | Yield gr/hour | MI | HLMI | FRR |
|---|---|---|---|---|---|---|---|
| 59 | 0.0385 | none | 0 | 17 | 0.07 | 3.1 | 44 |
| 60 | 0.0385 | TES | 0.0775 | 39 | 0.12 | 4.9 | 41 |
| 61 | 0.0385 | MDES | 0.0775 | 38 | 0.16 | 6.7 | 42 |

The data shown in Tables IX to XIII also demonstrates that the use of the silane additives of the present invention greatly increases the yield of polymer produced without deleteriously affecting the properties of such polymers. The polymers made in Examples 43–61, when made with the aid of the silane additives of the present invention, had relatively low catalyst residue contents as a result of the high productivity of the catalysts, and had good color and odor properties as well.

What is claimed is:
1. In a process for polymerizing a monomer charge comprising at least one alpha olefin by contacting it with inorganic oxide supported bis(cyclopentadienyl)chromium [II] catalyst, the improvement which comprises modifying said catalyst, prior to said contact, with at least one silane compound having the structure $H_3Si[SiH_2]_mH$ or $R_{4-n}SiH_n$
    wherein $m$ is an integer from 0 to 3, inclusive, R is a $C_1$ to $C_{10}$, inclusive, hydrocarbon radical and $n$ is an integer from 0 to 3, inclusive.

2. A process as in claim 1 in which said silane compound has the structure $$H_3Si\{SiH_2\}_mH$$

3. A process as in claim 2 in which said silane compound is $SiH_4$.

4. A process as in claim 3 in which said monomer charge comprises ethylene.

5. A process as in claim 4 in which ethylene is homopolymerized.

6. A process as in claim 1 in which said silane compound has the structure $$R_{4-n}SiH_n$$

7. A process as in claim 6 in which said monomer charge comprises ethylene.

8. A process as in claim 7 in which ethylene is homopolymerized.

9. A process as in claim 7 in which ethylene is interpolymerized with at least one other alpha olefin.

10. A process as in claim 9 in which ethylene is interpolymerized with propylene.

11. A process as in claim 9 in which ethylene is interpolymerized with butene-1.

12. A process as in claim 6 in which $n$ is 0.

13. A process as in claim 12 in which the silane compound comprises tetraethyl silane.

14. A process as in claim 6 in which $n$ is 1.

15. A process as in claim 14 in which the silane compound comprises triethyl silane.

16. A process as in claim 14 in which the silane compound comprises methyl diethyl silane.

17. A process as in claim 14 in which the silane compound comprises trihexyl silane.

18. A process as in claim 6 in which $n$ is 2.

19. A process as in claim 18 in which the silane compound comprises diethyl silane.

20. A process as in claim 6 in which $n$ is 3.

21. A process as in claim 20 in which the silane compound comprises butyl silane.

22. A process as in claim 20 in which the silane compound comprises phenyl silane.

23. A process as in claim 1 in which about 0.1 to 50 moles of said silane compound are used per mole of the organochromium compound.

24. A process as in claim 1 which is conducted in an inert solvent medium.

25. A process as in claim 24 which is conducted under slurry polymerization conditions.

26. A process as in claim 24 which is conducted under solution polymerization conditions.

27. A process as in claim 1 which is conducted in a fluid bed reactor.

28. In a process for polymerizing a monomer charge comprising at least one alpha olefin by contacting it with at least one bis(cyclopentadienyl)chromium [II] compound supported on inorganic oxide, said bis(cyclopentadienyl)chromium [II] compound having the structure

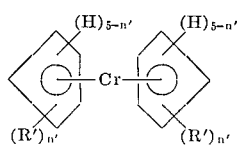

wherein $n'$ is an integer of 0 to 3, inclusive, and $R'$ is a $C_1$ to about $C_{20}$, inclusive, hydrocarbon radical, and said inorganic oxide having a high surface area and being selected from the group consisting of silica, alumina, thoria, zirconia, and mixtures thereof, the improvement which comprises modifying said catalyst, prior to said contact, with at least one silane compound having the structure $H_3Si\{SiH_2\}_mH$ or $R_{4-n}SiH_n$ wherein $m$ is an integer from 0 to 3 inclusive, R is a $C_1$ to $C_{10}$, inclusive, hydrocarbon radical, and $n$ is an integer from 0 to 3, inclusive.

29. A process as in claim 28 in which $n'$ is 0.

30. A process as in claim 29 in which the silane compound has the structure $$H_3Si\{SiH_2\}_mH$$

31. A process as in claim 30 in which the silane compound comprises silane.

32. A process as in claim 31 in which the inorganic oxide comprises silica.

33. A process as in claim 32 in which said monomer charge comprises ethylene.

34. A process as in claim 33 in which ethylene is homopolymerized.

35. A process as in claim 29 in which the silane compound has the structure $$R_{4-n}SiH_n$$

36. A process as in claim 35 in which the monomer charge comprises ethylene.

37. A process in claim 36 in which ethylene is homopolymerized.

38. A process as in claim 36 in which ethylene is interpolymerized with propylene.

39. A process as in claim 36 in which ethylene is interpolymerized with butene-1.

40. A process as in claim 35 in which the silane compound comprises diethyl silane.

41. A process as in claim 35 in which the silane compound comprises triethyl silane.

42. A process as in claim 35 in which the silane compound comprises methyl diethyl silane.

43. A process as in claim 35 in which the silane compound comprises phenyl silane.

44. A process as in claim 35 in which the silane compound comprises butyl silane.

45. A process as in claim 35 in which the silane compound comprises trihexyl silane.

46. A process as in claim 35 in which the silane compound comprises tetraethyl silane.

47. An olefin polymerization catalyst which comprises inorganic oxide supported bis(cyclopentadienyl)chromium [II] modified with silane compound having the structure $H_3Si\{SiH_2\}_mH$ or $R_{4-n}SiH_n$ wherein $m$ is an integer from 0 to 3, inclusive, $n$ is an integer from 0 to 3, inclusive, and R is a $C_1$ to $C_{10}$, inclusive, hydrocarbon radical.

48. A catalyst as in claim 47 in which said inorganic oxide is selected from the group consisting of silica, alumina, thoria, zirconia and mixtures thereof.

49. A catalyst as in claim 48 in which the silane compound has the structure $$H_3Si\{SiH_2\}_mH$$

50. A catalyst as in claim 49 in which the silane compound comprises silane.

51. A catalyst as in claim 50 in which the inorganic oxide support comprises silica.

52. A catalyst as in claim 48 in which the silane compound has the structure $$R_{4-n}SiH_n$$

53. A catalyst as in claim 52 in which the inorganic oxide support comprises silica.

54. A catalyst as in claim 53 in which $n$ is 0.

55. A catalyst as in claim 54 in which the silane compound comprises tetraethyl silane.

56. A catalyst as in claim 53 in which $n$ is 1.

57. A catalyst as in claim 56 in which the silane compound comprises triethyl silane.

58. A catalyst as in claim 56 in which the silane compound comprises methyl diethyl silane.

59. A catalyst as in claim 56 in which the silane compound comprises trihexyl silane.

60. A catalyst as in claim 53 in which $n$ is 2.

61. A catalyst as in claim 60 in which the silane compound comprises diethyl silane.

62. A catalyst as in claim 53 in which $n$ is 3.

63. A catalyst as in claim 62 in which the silane compound comprises butyl silane.

64. A catalyst as in claim 62 in which the silane compound comprises phenyl silane.

65. A catalyst as in claim 52 in which the inorganic oxide support comprises alumina.

66. A catalyst as in claim 65 in which the inorganic oxide support comprises silica-alumina.

67. A catalyst as in claim 66 in which $n$ is 1.

68. A catalyst as in claim 67 in which the silane compound comprises triethyl silane.

69. A catalyst as in claim 67 in which the silane compound comprises methyl diethyl silane.

70. A catalyst as in claim 47 which comprises about 0.1 to 50 moles of said silane compound per mole of said chromium compound.

71. In a process for polymerizing a monomer charge comprising at least one alpha olefin by contacting it with at least one bis(cyclopentadienyl)chromium [II] compound supported on an inorganic oxide support, the improvement which comprises modifying said catalyst, prior to said contact, with at least one hydrocarbyl silane.

72. A process as in claim 71 which is conducted in an inert solvent medium.

73. A process as in claim 72 which is conducted under slurry polymerization conditions.

74. A process as in claim 72 which is conducted under solution polymerization conditions.

75. A process as in claim 72 which is conducted in a fluid bed reactor.

* * * * *

UNITED STATES PATENT OFFICE
CERTIFICATE OF CORRECTION

Patent No. 3,687,920      Issue Date August 29, 1972

Inventor(s)    R. N. Johnson

It is certified that error appears in the above-identified patent and that said Letters Patent are hereby corrected as shown below:

Column 2, line 17, the structure should read $H_3Si[SiH_2]_m H$.

Column 9, line 54, "as" should read --are--.

Column 11, line 3, "maintaining" should read --maintain--.

Column 11, line 9, --in-- should be inserted after "aid".

Column 11, line 18, "enterior" should read --exterior--.

Column 18, line 8, "$\geq$" should read "$\leq$".

Column 21, The headings for the four left hand columns in Table X should read --Ex    BCPC    Silane    Support --.
               m moles    m moles    Act. Temp. °C.

Column 21, The yield, MI and HLMI values reported for Example 48 in Table X should read --96--, --3.4-- and --144--, respectively.

Column 21, The heading for the two left hand columns in Table XI should read --Ex    BCPC --.
               m moles Column 22, The heading for the two left hand columns in each of Tables XII and XIII should read --Ex    BCPC --.
               m moles (Continued on next page)

UNITED STATES PATENT OFFICE
CERTIFICATE OF CORRECTION

Patent No. 3,687,920  Issue Date August 29, 1972

Inventor(s)  R. N. Johnson

It is certified that error appears in the above-identified patent and that said Letters Patent are hereby corrected as shown below:

--Page 2--

Column 22, the grams of comonomer reported for Examples 53-58 in Table XII, in parenthesis, should be listed under the column headed "comonomer (grams)" and not under the column headed "Ex".

Column 22, line 32 --was-- should be inserted after "support".

Signed and sealed this 8th day of May 1973.

(SEAL)
Attest:

EDWARD M. FLETCHER, JR.  ROBERT GOTTSCHALK
Attesting Officer  Commissioner of Patents